(12) United States Patent
Ricketts

(10) Patent No.: US 8,002,616 B2
(45) Date of Patent: Aug. 23, 2011

(54) AGRICULTURAL COMBINE WITH INTERNAL COB DE-HUSKING APPARATUS AND SYSTEM

(75) Inventor: Jonathan E. Ricketts, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/566,370

(22) Filed: Sep. 24, 2009

(65) Prior Publication Data

US 2010/0018177 A1    Jan. 28, 2010

Related U.S. Application Data

(63) Continuation-in-part of application No. 12/148,725, filed on Apr. 22, 2008, now Pat. No. 7,749,055.

(60) Provisional application No. 61/194,153, filed on Sep. 25, 2008.

(51) Int. Cl.
*B02B 3/00* (2006.01)

(52) U.S. Cl. ............. 460/26; 460/25; 460/27; 460/29; 460/30

(58) Field of Classification Search ............ 460/25–32, 460/42, 71, 79, 98, 107–110
See application file for complete search history.

(56) References Cited

U.S. PATENT DOCUMENTS

| | | | |
|---|---|---|---|
| 702,344 A * | 6/1902 | Crosby | 460/28 |
| 705,311 A * | 7/1902 | Alexander et al. | 460/16 |
| 0,952,795 A | 3/1910 | Flynn | |
| 1,478,426 A * | 12/1923 | Dueker | 460/29 |
| 2,247,557 A | 7/1941 | Medley | |
| 2,333,901 A | 11/1943 | Swenson | |
| 2,549,999 A * | 4/1951 | Andrews | 56/106 |
| 2,577,329 A | 12/1951 | Irvine | |
| 2,804,077 A | 8/1957 | Anderson | |
| 2,961,818 A * | 11/1960 | Hadley | 56/14.7 |
| 3,112,752 A * | 12/1963 | Morrison et al. | 460/26 |
| 3,680,291 A | 8/1972 | Soteropulos | |
| 3,716,060 A | 2/1973 | Suzue | |
| 3,952,889 A | 4/1976 | Wanker et al. | |
| 4,188,160 A | 2/1980 | Corbett et al. | |
| 4,291,521 A * | 9/1981 | Haake | 56/13.5 |
| 4,373,536 A * | 2/1983 | da Silva | 460/46 |
| 4,509,273 A | 4/1985 | Roisen | |
| 4,600,019 A | 7/1986 | McBroom | |
| 4,805,643 A | 2/1989 | Tetaka | |
| 4,892,505 A | 1/1990 | Shrawder | |

(Continued)

FOREIGN PATENT DOCUMENTS

JP    2004057117    2/2004

*Primary Examiner* — Thomas B Will
*Assistant Examiner* — Mai Nguyen
(74) *Attorney, Agent, or Firm* — Michael G. Harms; Patrick M. Sheldrake

(57) ABSTRACT

The combine includes internal apparatus incorporated into a system for threshing corn kernels from cobs, positively de-husking the cobs, cleaning other crop residue or material from the kernels, and direct the cleaned kernels and de-husked cobs to desired locations. The de-husking apparatus can include a modified type of husking bed, and is disposed for receiving a flow of grain, cobs and other residue from threshing apparatus of the combine, and positively grasping and pulling the remaining husks from the cobs and downwardly through the husking bed for disposal such as by discharge from the combine onto a field, with or separately from the other residue.

21 Claims, 13 Drawing Sheets

U.S. PATENT DOCUMENTS

| | | |
|---|---|---|
| 5,041,059 A | 8/1991 | Ricketts et al. |
| 5,176,573 A * | 1/1993 | Dow .............................. 460/42 |
| 5,256,106 A | 10/1993 | Shrawder |
| 5,451,184 A * | 9/1995 | Mietzel ........................... 460/32 |
| 5,941,768 A | 8/1999 | Flamme |
| 6,358,141 B1 | 3/2002 | Stukenholtz et al. |
| 6,537,148 B2 | 3/2003 | Schwersmann |
| 7,163,457 B2 | 1/2007 | Esken et al. |
| 7,524,242 B2 * | 4/2009 | Stukenholtz et al. ......... 460/115 |
| 2009/0095662 A1 | 4/2009 | Redekop et al. |
| 2009/0104952 A1 | 4/2009 | Redekop et al. |
| 2009/0124309 A1 | 5/2009 | Redekop et al. |
| 2009/0137295 A1 | 5/2009 | Redekop et al. |

* cited by examiner

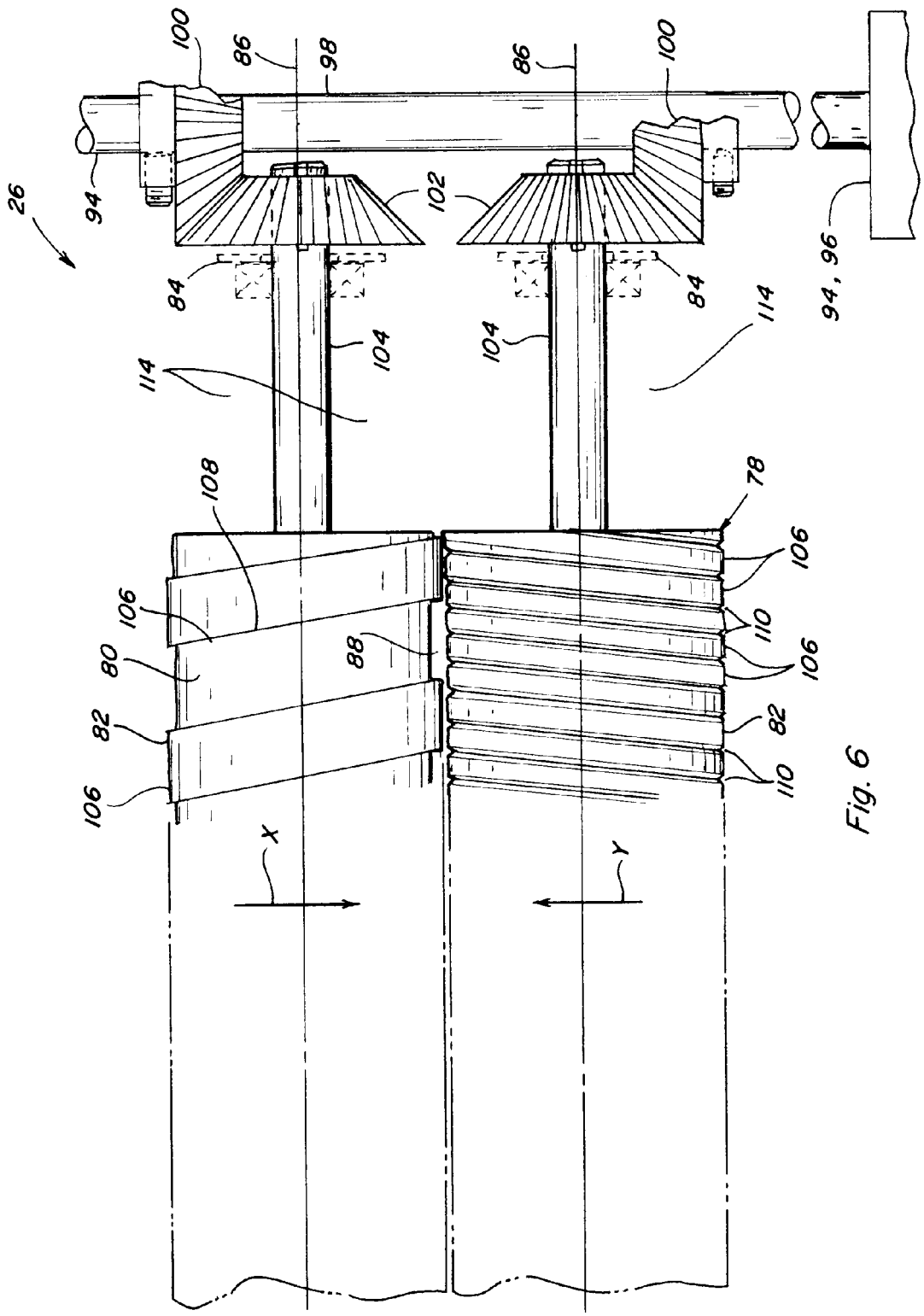

US 8,002,616 B2

AGRICULTURAL COMBINE WITH INTERNAL COB DE-HUSKING APPARATUS AND SYSTEM

This application is a continuation-in-part of U.S. patent application Ser. No. 12/148,725, filed Apr. 22, 2008, now U.S. Pat. No. 7,749,055 and also claims the benefit of U.S. Provisional Patent Application Ser. No. 61/194,153, filed Sep. 25, 2008.

TECHNICAL FIELD

This invention relates generally to an agricultural combine including a cob de-husking capability, and more particularly, to a combine adapted for harvesting corn, which incorporates internal, positive cob de-husking apparatus in a system for de-husking cobs from which the corn has been harvested, and separating or cleaning the cobs from the husks and other stover such as leaves, stalks, and the like.

BACKGROUND OF THE INVENTION

Co-pending U.S. patent application Ser. No. 12/148,725, filed Apr. 22, 2008, and U.S. Provisional Application No. 61/194,153, filed Sep. 25, 2008, are incorporated herein in their entirety by reference.

Presently, there is an increased demand for corn cobs as a feedstock for cellulosic ethanol, as well as other uses. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect only the cobs, that is, clean cobs with substantially all residual husks, leaves and stalks removed, and return the other stover to the field. Thus, it would be desirable to have a means adapted for operation in connection with a corn harvester, which incorporates an ability to separate or clean the cobs from the other stover, remove husks and the like attached to the cobs, and return the other stover to the field or another location. It is also desirable for the collected cobs to be as compactable as possible, e.g., without attached husks and the like, so as to maximize the amount of cobs that subsequent containers can hold. Still further, for some techniques for producing ethanol from corn cobs, the presence of other stover, e.g., husks and the like, is undesired, and for a load of cobs of a given volume, the amount of compensation paid will be reduced if significant stover is present.

Numerous apparatus have been proposed for cleaning or separating cobs from the other stover. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. During these earlier times, when corn was picked, de-husked and stored with the kernels of corn on the cob, many of the pickers used husking beds to remove the husk from the ear of corn. This was a trait that was desired as one did not want to fill the storage area for the corn, e.g., crib, with material that had no use, e.g., husks. The husking bed then was nothing more than a series of rollers that grabbed the husk and pulled it down through a gap in the bed. The husk would then fall to the ground as the picker continued to harvest the ears of corn.

This harvesting procedure has been almost entirely replaced by modern self-propelled combine type harvesters, which separate and collect the corn kernels, and discharge the cobs and other stover onto the field, and which are now the industry standard.

As a more recent advancement, several of such known devices have variously utilized a towed cart or wagon for receiving and holding the cobs, and a conveyor system for cleaning the other stover from the cobs and conveying the cobs from the combine to the cart or wagon. Others separate the cobs from at least some of the other stover within the combine. Reference in the former regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the stover from the cobs as they are released from the top of the second conveyor and to blow the stover back onto the field. Redekop et al. U.S. Patent Publication Nos. 20090095662 published Apr. 16, 2009; 20090104952 published Apr. 23, 2009; and 20090124309 published May 14, 2009, disclose a pulled cob collection unit, which utilizes a sequential series of inclined belt conveyors, and blower or suction fans for directing air through the discharged material as it falls from the upper end of one conveyor onto a lower end of the next conveyor, such that the heavier cobs are to continue to the next conveyor and the lighter stover or residue will be carried away by the air flow, with the cobs being conveyed into a collection tank by a further conveyor or conveyors.

Reference in the latter regard, Stukenholtz U.S. Pat. No. 6,358,141 issued Mar. 19, 2002, and Redekop et al. U.S. Patent Publication No. 20090137295, which disclose cob collection systems on a combine which utilize on-board bins and cob separation using modified straw walkers and sieves within the combine itself.

A shortcomings variously of the known cob separating or cleaning devices and systems, is a lack of a capability for reliably and positively removing husks and/or leaves, or fragments thereof, which still remain attached to the cobs after processing of the cobs through the systems of the combine, including gathering of the corn plants and separation of the corn ears from the stalks by the header, conveying through the feeder, agitation and separation of the kernels from the cobs by the threshing mechanism, and post-threshing handling, including in some cases passage through sieves and other systems designed for separating the cobs from the other residue or stover. As noted above, such attached husks and the like are disadvantageous as they increase the volume of the collected cobs, and reduce the ease of conveyance and compactability thereof, such that for a given volume of collected cobs, an undesirable portion of the volume can comprise the husks and the like which can have a lower energy content compared to the cobs alone, and create open spaces or interstices between the collected cobs, which factors can combine to reduce the value of a given volume of the collected cobs.

Thus, what is sought is apparatus and/or system for operation within a harvester, which provides one or more capabilities of positively separating or detaching attached husks from the cobs and separating the cobs from stover, maximizing cob density for storage, and which overcomes one or more of the disadvantages, set forth above.

SUMMARY OF THE INVENTION

What is disclosed is apparatus incorporated into a system within a combine harvester, which provides one or more capabilities of positively separating or detaching attached husks from cobs flowing from a threshing system of the combine, and separating the cobs from the other stover, thus maximizing cob density for storage, and which overcomes one or more of the disadvantages, set forth above.

Generally, a combine is used to process material that is referred to as MOG (material other than grain). In normal operation of a combine, the crop is gathered into the combine by driving the machine through a field with a head of the combine. The head places the crop into the combine. From there, it is processed, e.g., by the threshing and cleaning systems of the combine, and the MOG is discharged from the rear of the combine. As noted above, this MOG has normally not been desirable to save when harvesting the crop. However, as noted above, with the demand for fuel from grain, there has now become a desire or need to save more of the material other than the grain.

According to a preferred aspect of the invention, apparatus is configured and disposed within the combine to accept and positively de-husk cobs from which the corn kernels have been harvested. This apparatus preferably comprises a modified type of husking bed disposed for receiving a flow of grain, cobs and other stover, from the threshing system. With the modifications, the elements or husking rolls of the husking bed are operable for positively grasping and pulling the remaining husks from the cobs and downwardly through the husking bed. Corn also passes through the husking bed. Without the modifications, it was found that the husking elements would pull the cobs down through the husking bed as well, which is not desired. This is because the cob is much smaller than an ear of corn with which conventional husking beds are designed for use, as a result of which cobs can pass through a conventional husking bed.

With this invention, one can understand that, in contrast with past practices, removing the husks from ears of corn is not being attempted. Here, the corn has been processed by the threshing element or system of the combine, to remove the kernels from the cobs. Once the corn has been threshed, it (the kernels) will drop along a path from the threshing system to the cleaning system, and be processed and stored on the machine. This path can include all or part of the husking bed.

According to a preferred aspect of the invention, cobs and other MOG are discharged from the threshing system in a normal manner, e.g., rearwardly therefrom, separately from the corn. In another preferred aspect of the invention, a grate or grates of a concave of the threshing system is/are specially modified to allow passage of whole cobs therethrough. These aspects of the invention can be used together, or in the alternative. In both instances, the threshed cobs are fed in a stream onto the internal de-husking apparatus, instead of directed outwardly from the combine. The corn cleaned by the cleaning system typically remains on the machine until it requires being dumped in a transport vehicle and goes to its long term storage location. The cobs are then separated from the other MOG, and the other MOG is then transported rearward through the combine and typically spread over the ground.

According to another preferred aspect of the invention, the de-husking apparatus e.g., husking bed, is positioned such that the MOG is placed onto the husking bed, and the husking bed transports it rearwardly. At the same time that the husking bed is used to transport the MOG rearward, the MOG is being separated into two different classes—the cobs and the remaining MOG. As noted above, there is some value to the remaining MOG for fuel source, but it is low. This remaining MOG has a far better value as a fertilizer and a cover to prevent erosion.

Further according to the invention, the de-husking apparatus is configured to pull the husks from the cobs (what is left after the corn kernels were removed) as they are transported rearward thereon. The husks are then dropped down through the de-husking apparatus onto the cleaning system. The cleaning system will continue to separate the corn and the husks. The husk will then be carried out the back of the machine and be spread over the ground. The remaining cobs will be moved rearward on top of the de-husking apparatus and be saved and placed in a storage tank or other container, on the machine or towed thereby, until the time that the cobs need to be unloaded and transported to a long term storage location.

This invention has some notable advantages over some of the other concepts that have been tried by others. It is a very cost effective means of doing a simple job of removing husks from cobs. The total weight of the apparatus for accomplishing this compared to other devices, such as carts presently commercially available under the trade name Cob Caddy, is far less. As another advantage, the cob de-husking apparatus may be left in the machine at all times. The de-husking apparatus also does not change the overall size of the machine. It will not adversely affect the performance of the machine in other crops. As another advantage, it has been found that, after the corn has been shelled from the cobs, the husks are easier for the de-husking apparatus to grab. With the husks much more open than when on an ear of corn, it has also been found that we now will be able to remove far more or the remaining husks.

BRIEF DESCRIPTION OF THE DRAWINGS

FIG. 6 is a fragmentary top view showing aspects of the de-husking apparatus of the invention;

DETAILED DESCRIPTION OF THE INVENTION

Figure 1:
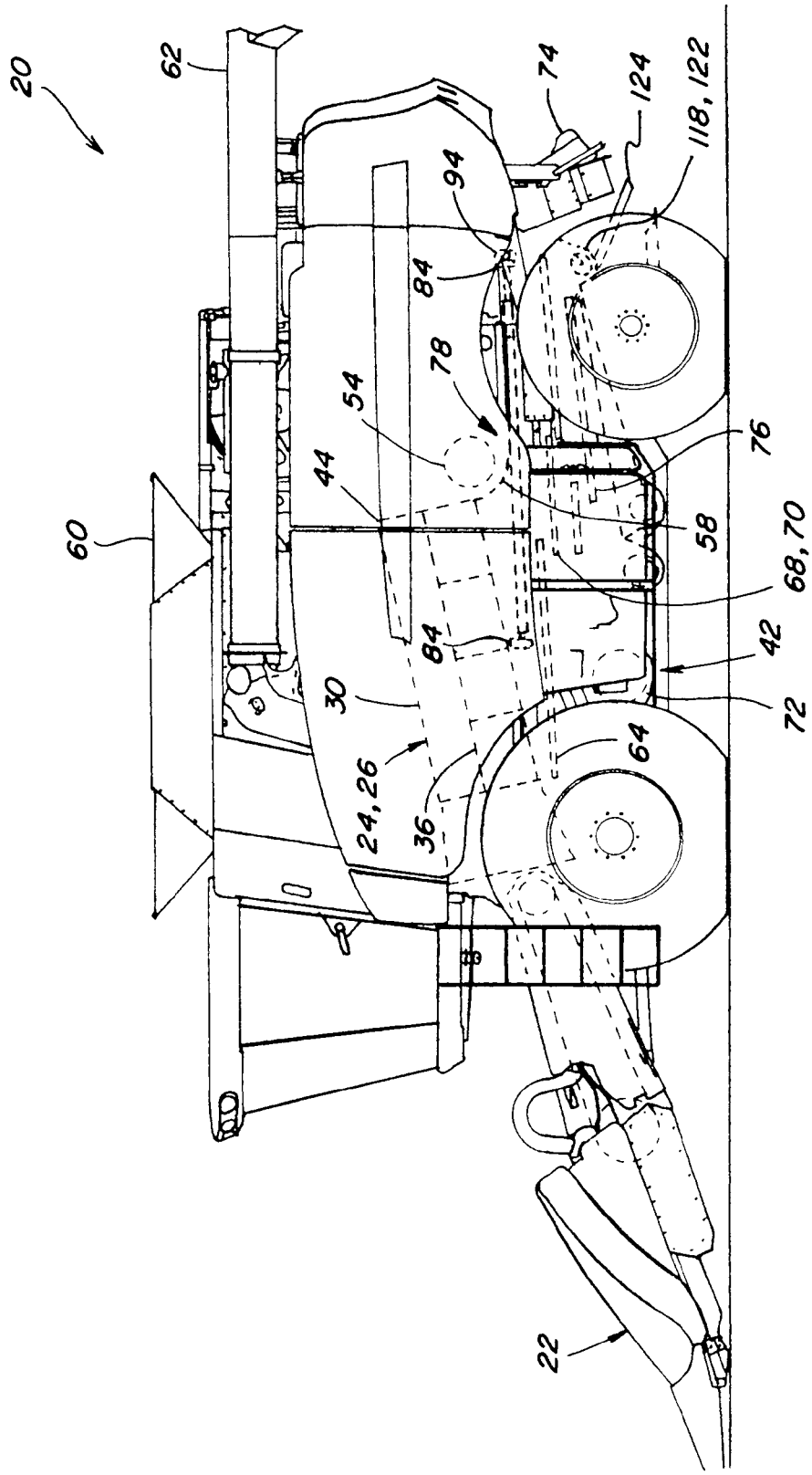
FIG. 1 is a simplified side view of an agricultural combine incorporating an internal de-husking apparatus in a system for de-husking and separating cobs from harvested corn and MOG, according to the invention.
Figure 2:
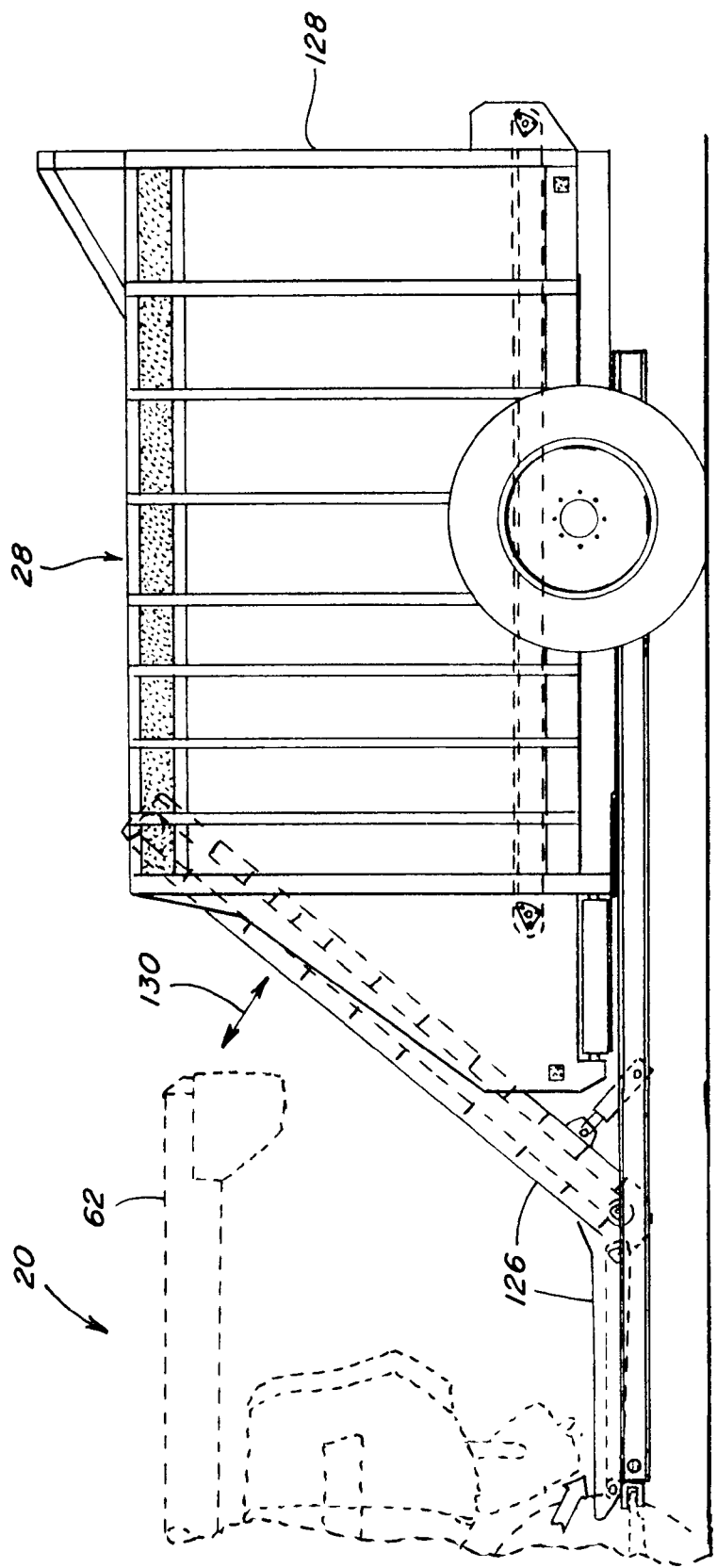
FIG. 2 is a simplified side view (in dotted lines) of the rear end of the combine of FIG. 1, shown towing a representative cob cart.
Figure 3:
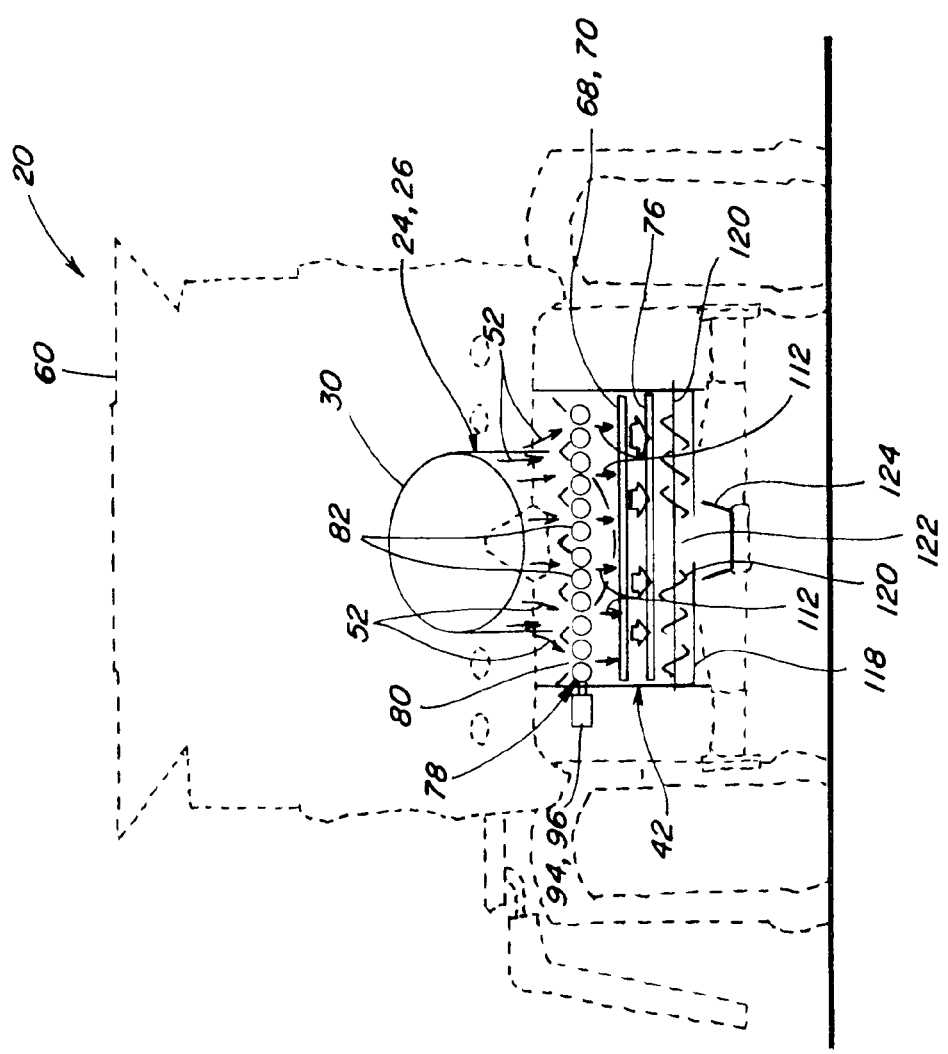
FIG. 3 is a rear view of the combine (in dotted lines), showing de-husking apparatus, a threshing system, and a cleaning system of the de-husking and separating system of FIG. 1.

Referring now the drawings, in FIGS. 1, 2 and 3, a representative agricultural harvesting machine 20 is shown, which is a combine constructed and operable in the well known manner for harvesting whole ears of corn from corn plants as the combine travels over a field. Combine 20 is shown including a header 22 that gathers and conveys the ears of corn into a threshing system 24 within the combine which is part of a system 26 of the invention for threshing kernels of corn from cobs of the ears, de-husking the cobs, cleaning other crop residue from the kernels and optionally the cobs, and separately directing the kernels and the cobs to respective destinations. FIG. 2 shows a representative cob collection device 28, which is a cart connected in towed relation to machine 20 and configured for conveying cobs away from machine 20 and holding them.

Figure 4:
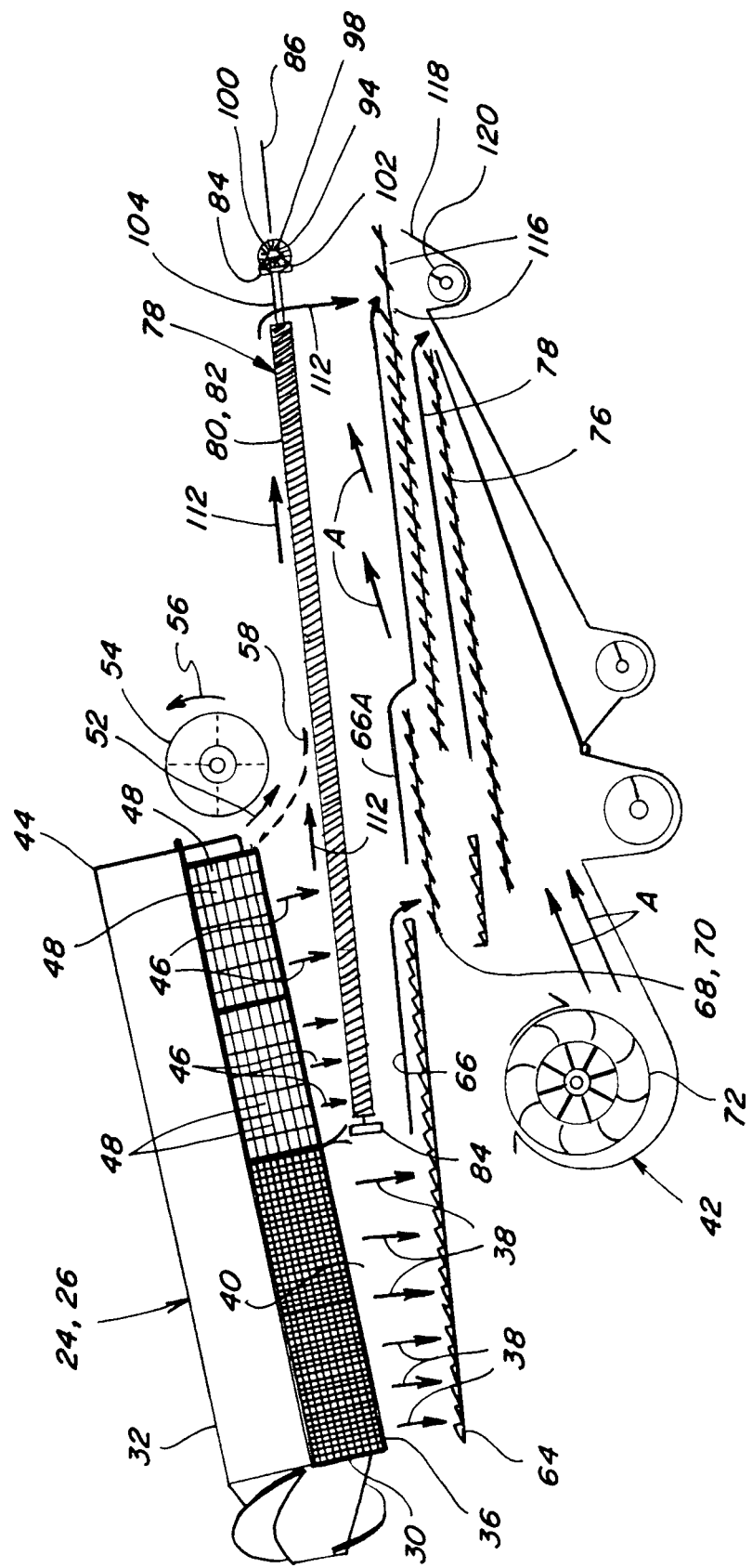
FIG. 4 is a simplified schematic side view showing aspects of one embodiment of the threshing system, de-husking apparatus, and cleaning system of the combine of FIG. 1.
Figure 5:
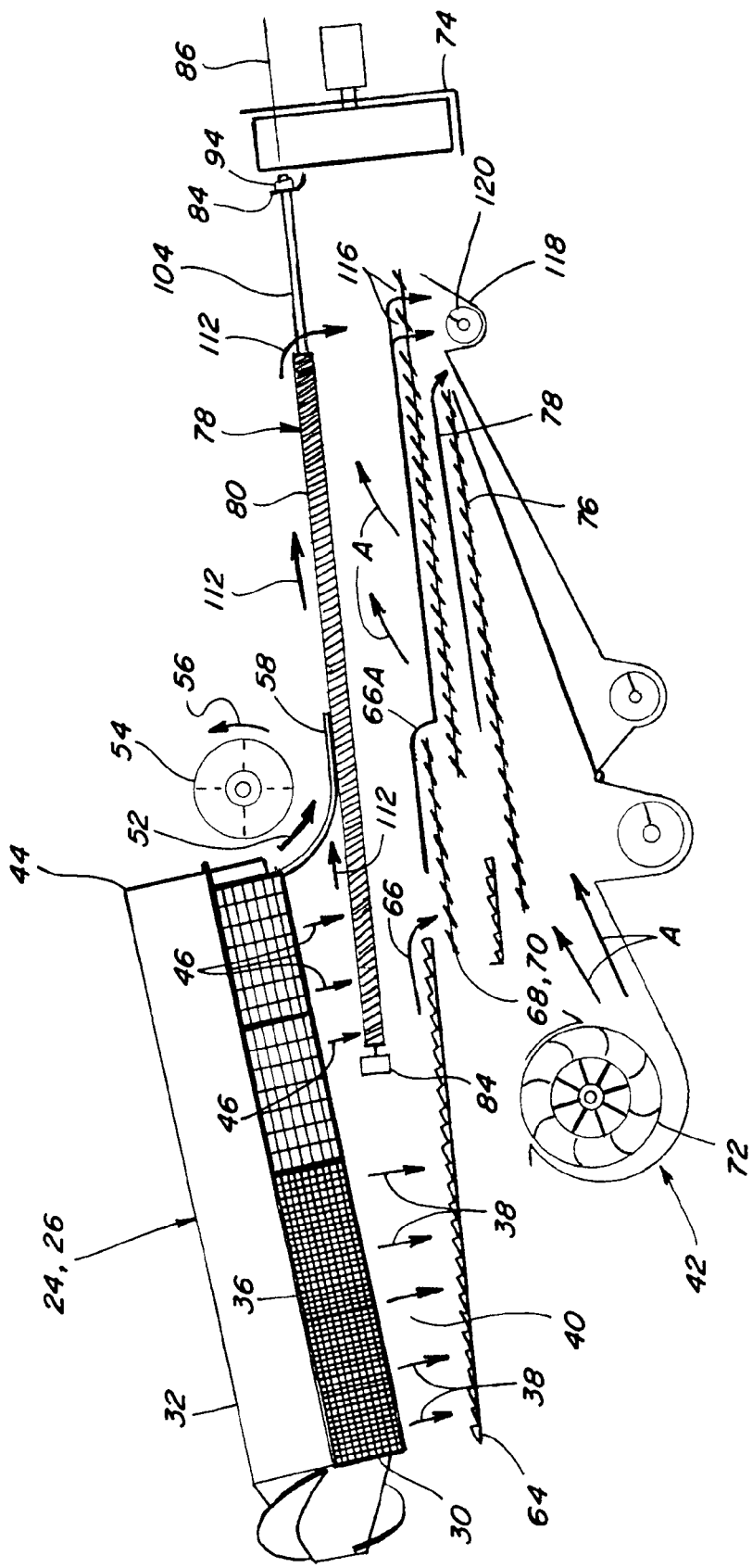
FIG. 5 is a simplified schematic side view showing aspects of the threshing system, alternative de-husking apparatus, and the cleaning system, in association with an optional spreader incorporated into a rear end of the combine.
Figure 7:
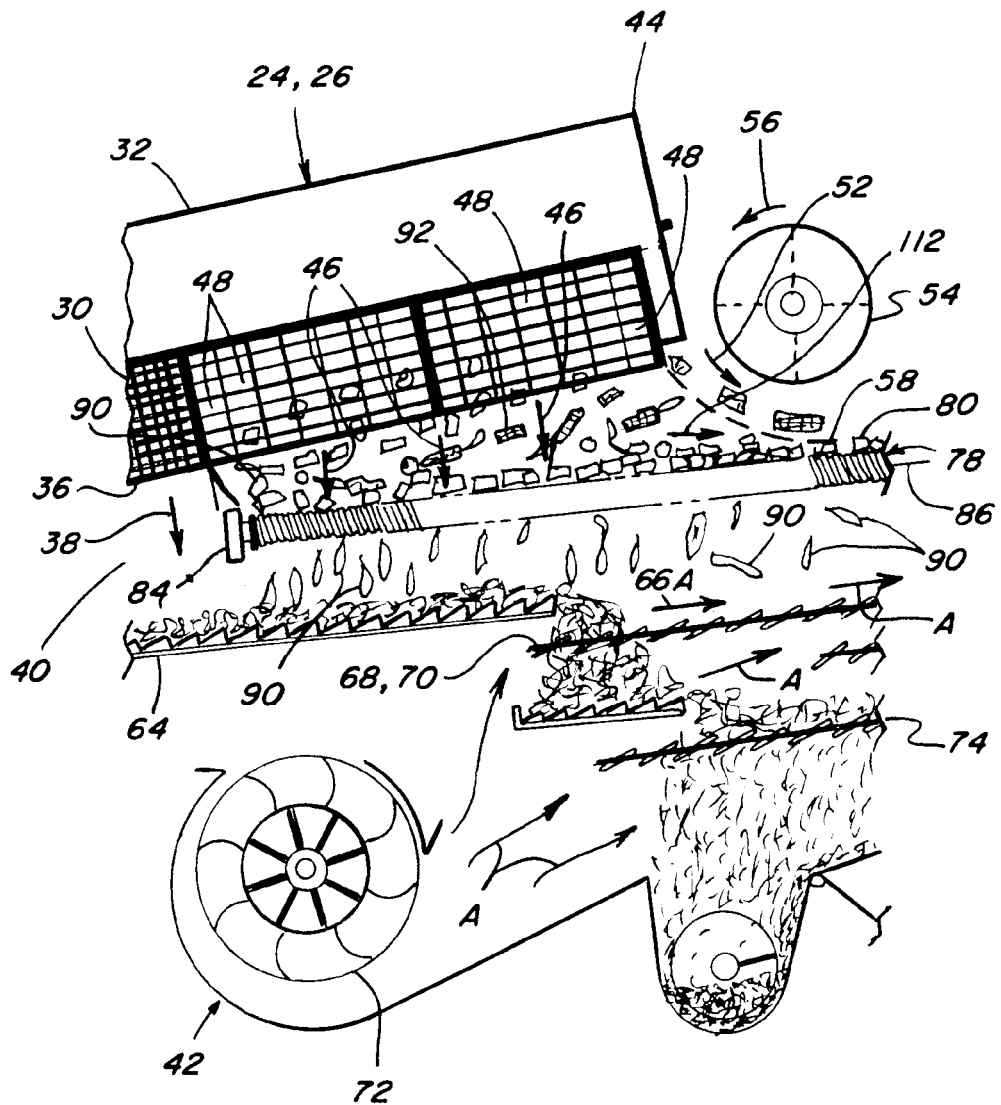
FIG. 7 is a fragmentary schematic side view of the threshing system, husking bed and cleaning system, illustrating operation thereof for threshing, de-husking cobs, and cleaning corn from MOG.
Figure 9:
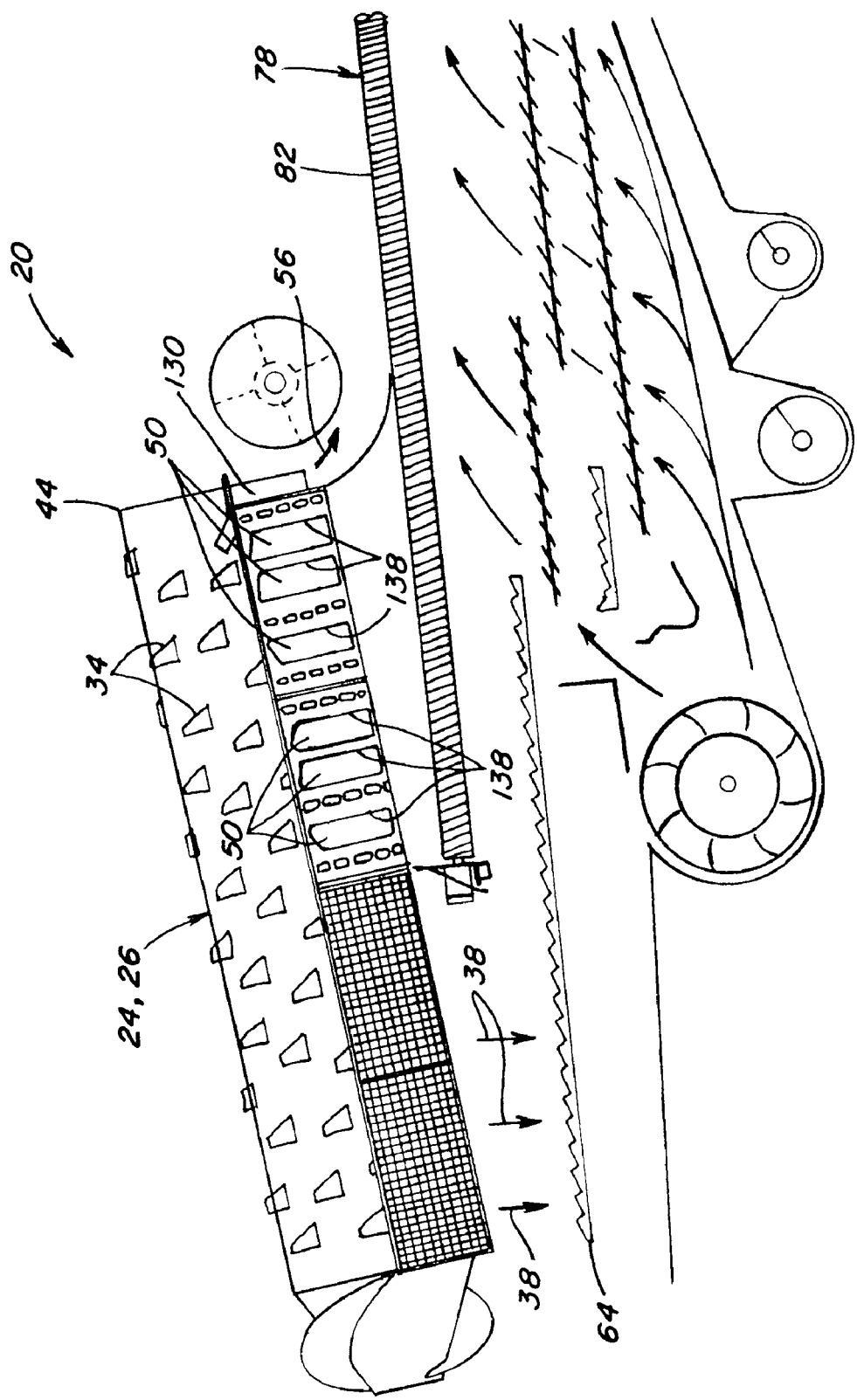
FIG. 9 is a simplified schematic side view of the de-husking and cob separating system of the invention, including alternative concave grates.
Figure 12:
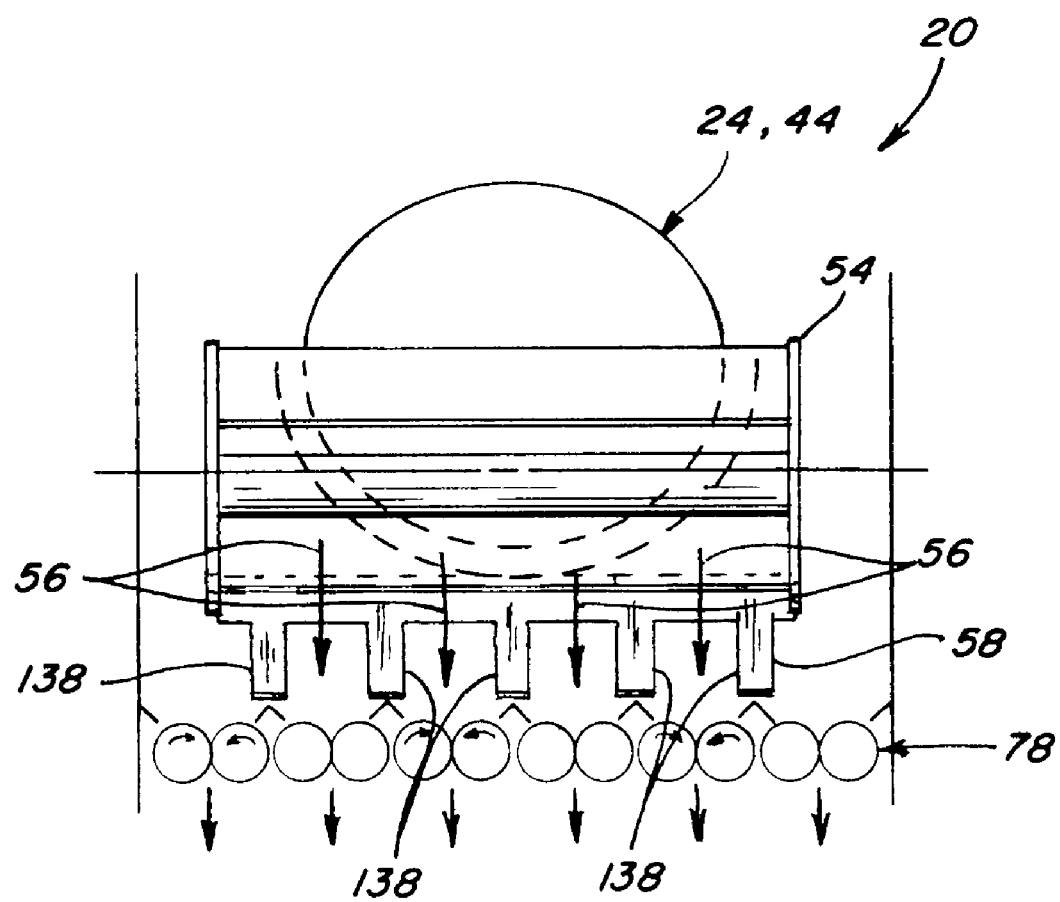
FIG. 12 is a rear view showing the internal de-husking apparatus in association with optional guide apparatus of the threshing system for conveying cobs and other crop residue to the de-husking apparatus.

Referring also to FIGS. 4, 5 and 7, threshing system 24 shown is representative of a wide variety of threshing apparatus that can be used in system 26 of the invention, and includes at least one generally cylindrical housing 30 containing a cylindrical rotor 32 which is configured (including threshing elements 34 thereabout as representatively illustrated in FIGS. 9 and 12) and rotated within housing 30, for forming the incoming crop material, e.g., ears of corn, crop residue or stover, etc., into a mat within a gap between housing 30 and rotor 32, and which mat is moved in a helical manner through the gap, in the well known manner (not shown).

Housing 30 includes a lower semi-cylindrical concave 36 comprised of elements, e.g., wires and/or bars defining openings therebetween, along and against which the crop material mat is moved by the rotation of rotor 32, for threshing the grain, e.g., corn kernels from the cobs. As a result, a flow of the grain, e.g., kernels, and other smaller elements of the crop material, collectively denoted by arrows 38 in FIGS. 4, 5 and 7, will then pass through concave 36 and fall downwardly within an internal cavity or chamber 40 of machine 20 which contains threshing system 24, and also a cleaning system 42 located therebelow.

Generally, as the crop material mat progresses along threshing system 24, less grain will be present in the mat, and the material that flows through concave 36 toward an outlet end thereof will consist more of stover or crop material other than grain (MOG) as denoted by arrows 46 in FIGS. 4 and 7. Also generally, a typical concave 36 will have larger apertures 48 toward outlet end 44, such that MOG flow 46 through apertures 48 will typically contain larger elements of MOG. In this regard, the aperture size can be smaller than the larger whole cobs contained in the MOG, such that flow 46 will contain only cob fragments, smaller cobs and other smaller MOG. Alternatively, larger apertures, such as illustrated by apertures in the form of slots 50 in FIGS. 9, 10 and 11, can be sufficiently large to allow larger whole cobs, and a greater overall number of cobs therethrough, as will be explained. In either instance, the MOG that does not pass through the concave, e.g, larger elements of MOG, such as stalk fragments, leaves, husks and remaining cobs, will be discharged from outlet end 44 of the threshing system, as a flow denoted by arrows 52, flow 52 preferably being facilitated by suitable apparatus, such as a rotary beater 54, rotatable as denoted by arrow 56, a deflector, guides, or the like (not shown). An optional concave pan or flow guide 58, can be disposed beneath beater 54, for containing and guiding MOG flow 52, as will be explained.

Cleaning system 42 of combine 20 is operable in the conventional manner to separate the cobs and other larger elements of the corn residue or stover from the kernels of corn and smaller elements of residue, and the clean corn is collected and conveyed into a clean grain tank 60 on combine 20, or other receiver. The clean corn is then unloaded from tank 60 using an unloader conveyor 62 in the conventional manner, by swinging conveyor 62 to a sidewardly extending position (not shown—conveyor 62 being illustrated in a stowed or travel position here).

On larger combines such as shown, cleaning system 42 typically essentially comprises a rearwardly extending platform within chamber 40, including a grain pan 64 beneath a more forward portion of threshing system 34, in position for receiving all or a substantial portion of flow 38 comprising mostly grain as discussed above. Pan 64 is configured and will be reciprocatingly moved in a fore and aft direction in the well known manner, for moving the grain rearwardly, as depicted by arrow 66 in FIGS. 4 and 5, and onto a forward section 68 of an upper sieve 70 of cleaning system 42. Forward section 68, and the rest of sieve 70 will also be reciprocatingly moved in a fore and aft direction in the well known manner, and will have apertures therethrough sized to allow the grain of flow 66, e.g., corn kernels, to fall therethrough, but not larger items, such that larger, heavier MOG, denoted by arrow 66A, will be moved rearwardly on sieve 70 toward a rear end thereof, as will be explained.

Cleaning system 42 includes a fan 72 operable for directing a flow of air, denoted by arrows A, upwardly and rearwardly through elements of that system including sieve 70, to lift and carry away lighter elements of MOG mixed with or contained in flow 66A or otherwise disposed on or above sieve 70. Typically, these lighter elements of MOG will be directed outwardly from internal chamber 40, either to fall onto the ground, or into a spreader 74 located on the rear of machine 20, as illustrated in FIGS. 1 and 5, so as to be spread over the ground thereby in the well known manner.

Cleaning system 42 additionally includes a lower sieve 76 disposed beneath upper sieve 70 in position for receiving the grain and smaller elements of MOG. Sieve 76 is also reciprocatingly moved fore and aft, and air flow A will also pass through sieve 76 to remove the lighter elements of the MOG, and the heavier elements will be carried toward the rear end of the sieve, also in the well known manner, as denoted by arrow 78, for passage to a tailings system of machine 20. The grain that is allowed to pass through lower sieve 76 will be collected and directed to tank 60, in the well known manner.

Figure 10:
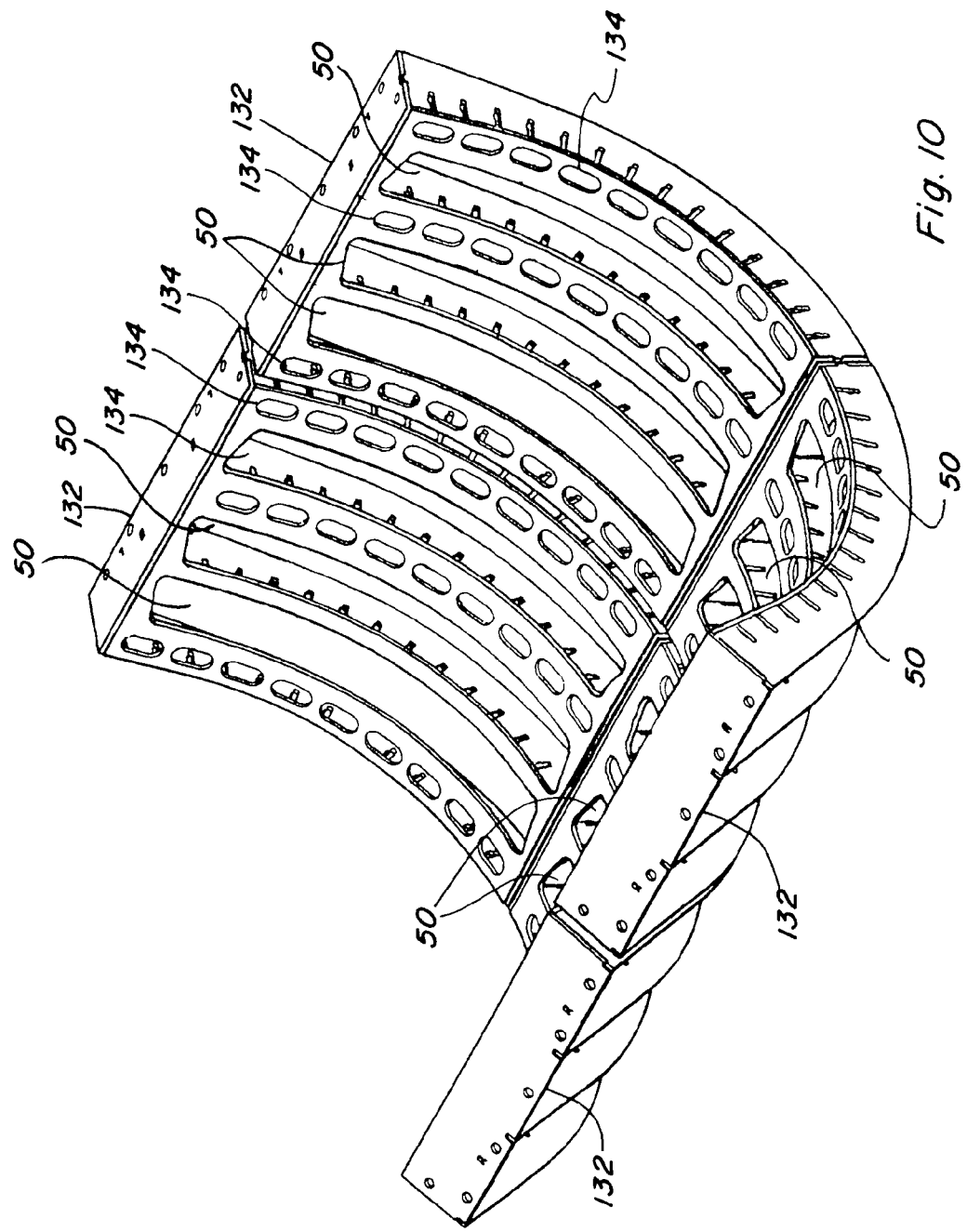
FIG. 10 is a perspective view of the grates of FIG. 9.
Figure 11:
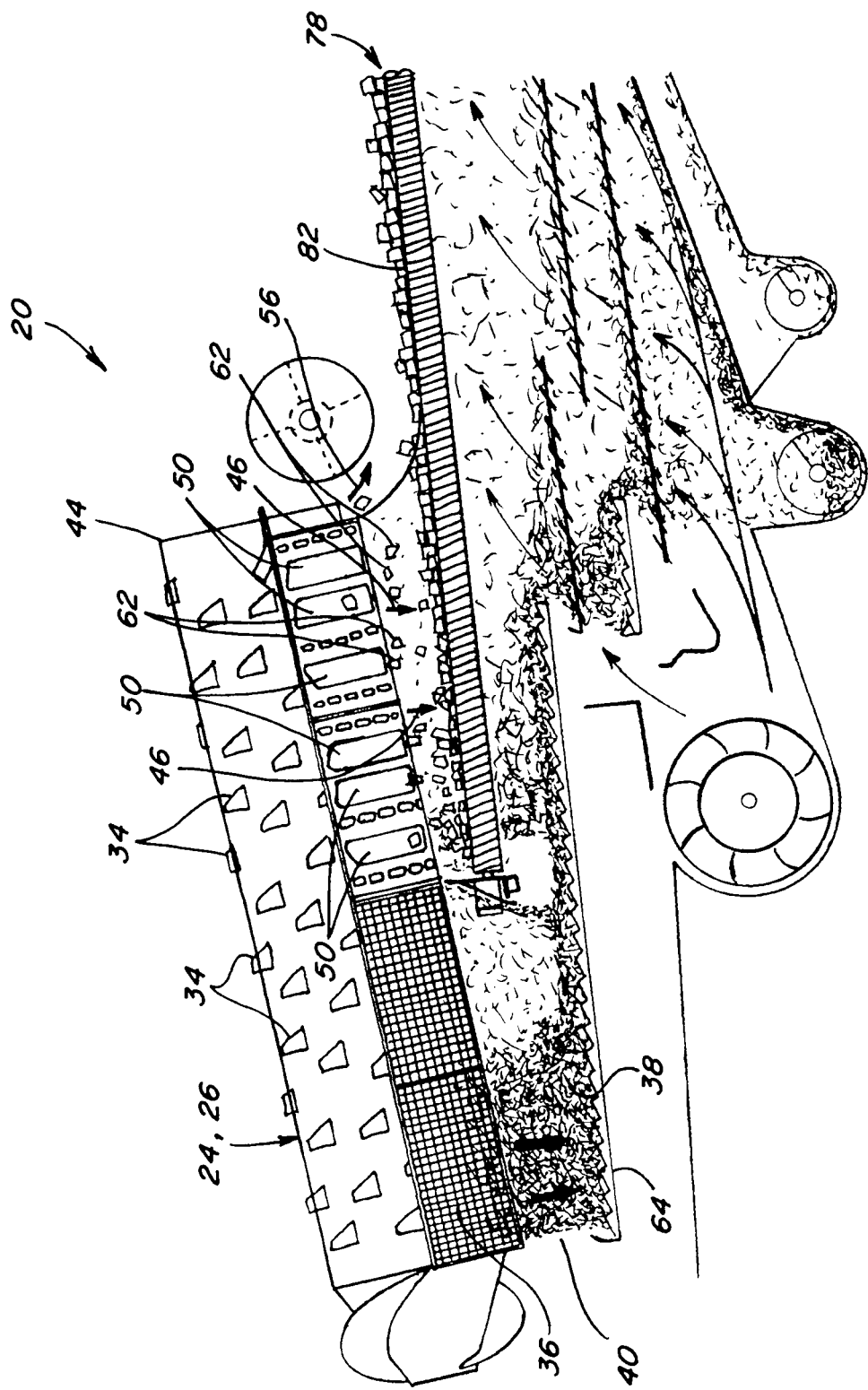
FIG. 11 is another simplified schematic side view of the system of FIG. 9, showing operation thereof.

As discussed above, it has become desirable to separate cobs and collect from the other MOG or stover, for a variety of reasons. But, as also discussed, in many instances, even after processing by threshing system 24, a substantial portion of the cobs will still have husks attached thereto, which is undesirable for a variety of reasons. Therefore, system 26 of the invention incorporates apparatus 78 configured and disposed within chamber 40, for positively de-husking the cobs discharged from threshing system 24. In this regard, apparatus 78 preferably comprises a modified type of husking bed that is disposed for receiving all, or a substantial portion of the cobs discharged from threshing system 24, whether contained in flow of MOG 46 which passes through apertures 48 of concave 36, or flow 52 discharged from outlet end of system 24. Here, in FIGS. 1 and 4, apparatus 78 is shown extending forwardly beneath about that portion of concave 36 containing larger apertures 48, so as to essentially be positioned for receiving all of the MOG flow 46, while in FIG. 5, apparatus 78 extends forwardly only partially beneath that region of the concave and will receive only a corresponding portion of MOG flow 46. In both instances, however, apparatus 78 is positioned beneath that region of threshing system 24 from which cobs are discharged, particularly outlet end 44, so as to be capable of receiving MOG flow 52 which will contain a significant number of the cobs. In this latter regard, in the absence of beater 54, MOG flow 52 can just fall onto apparatus 78, and if beater 54 is provided, it can be operated in a manner for directing MOG flow 52 onto and rearwardly along apparatus 78. Alternatively, beater 54 and flow guide 58 could be configurable and operable for propelling flow 56 rearwardly over apparatus 78, for instance, when harvesting a crop other than corn, or if threshing system is alternatively configured for delivering the cobs to apparatus in another manner, e.g., via a concave having larger apertures such as larger slots 50 (FIGS. 9, 10 and 11).

Figure 6A:
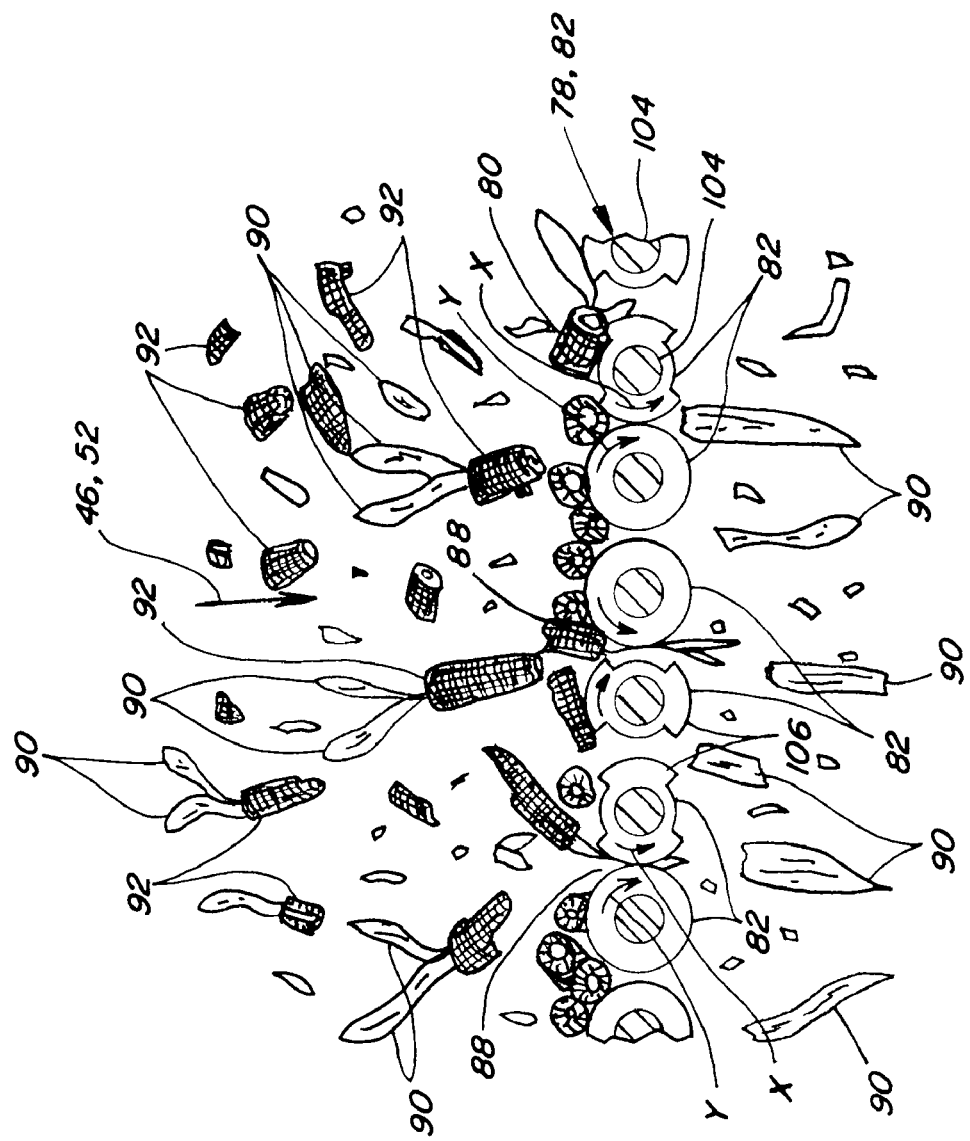
FIG. 6A is an end view of the de-husking apparatus, showing operation thereof.
Figure 8:
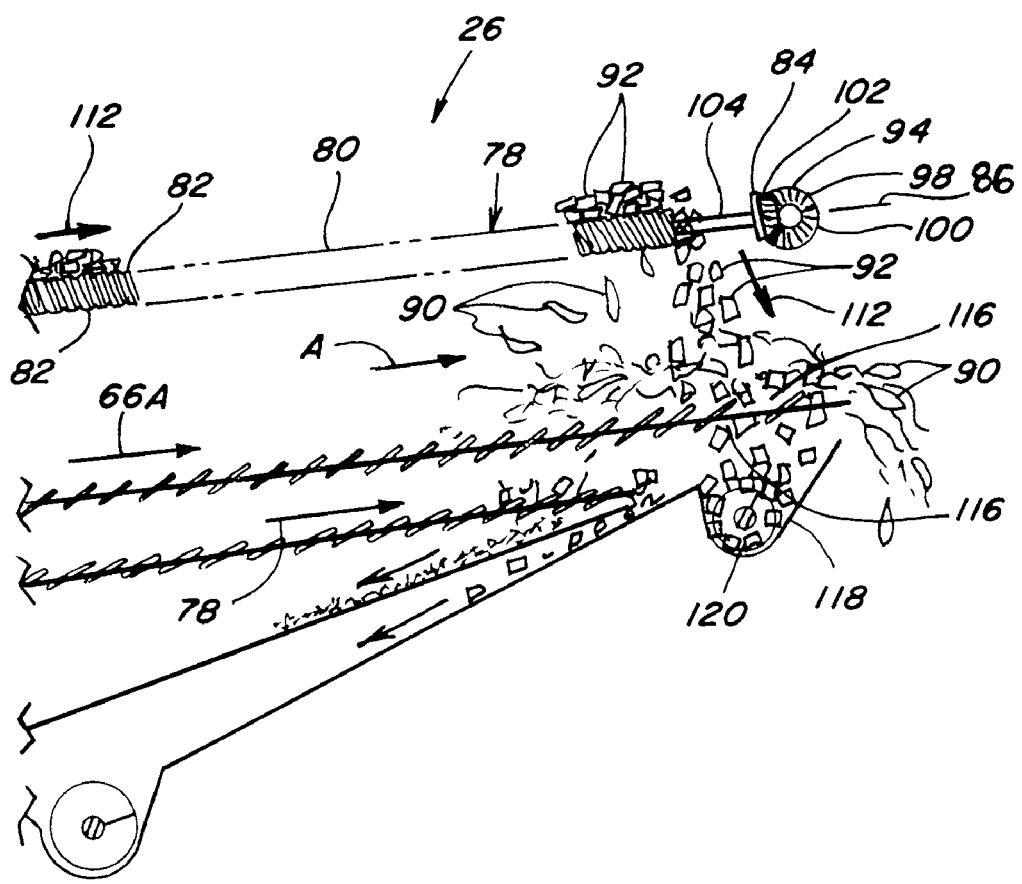
FIG. 8 is another fragmentary schematic side view, showing the de-husking apparatus and cleaning system in operation for de-husking cobs and cleaning corn.

Referring also to FIGS. 6, 6A and 8, apparatus 78 essentially comprises a generally flat upwardly facing surface 80 comprising a side-by-side array of elongate husking rolls 82 supported by as suitable framework 84, e.g., cross members across chamber 40, or other structure on machine 20 within chamber 40, for rotation about longitudinal axes 86 through the respective rolls 82. Selected adjacent sets of husking rolls 82 bound longitudinally extending gaps 88 therebetween (FIGS. 6 and 6A), gaps 88 being sufficiently large for receiving husks 90 and smaller elements of crop residue as well as kernels therein, but not cobs 92. The array of husking rolls 82 will have a number of sets of rolls 82 to provide an overall width corresponding to the width of that portion of chamber 40 of machine 20 containing apparatus 78. And, if cleaning system 42 is configured in the well known manner to be self leveling, apparatus 78 can optionally be configured to be self leveling also.

The husking rolls 82 are connected to a drive 94 which can include, for instance, a fluid or electric motor 96, connected in driving relation to a drive train including a cross shaft 98 carrying bevel gears 100 enmeshed with bevel gears 102 on shafts 104 extending between elements of framework 84 and supporting the respective husking rolls 82, such that the individual rolls 82 of the sets will be counter rotated, as denoted by arrows X and Y in FIGS. 6 and 6A. Alternatively, a chain, belt or other drive could be used for counter rotating rolls 82, as desired or required for a particular application.

Husking rolls 82 preferably include husking elements 106 on the outer surfaces thereof, as best shown in FIG. 6, configured for operation in cooperation with the adjacent rolls 82, for mechanically grasping and detaching attached husks 90 from cobs 92 as husking rolls 82 are rotated in contact with the cobs. It is contemplated that husking elements 106 can have a variety of configurations, e.g., shapes and features, for grasping and pulling husks 90 from cobs 92, husking elements 106 on some of rolls 82 preferably being configured as longitudinally extending helical concave regions 76 on the outer surfaces of rolls 68, bounded by longitudinally extending, raised helical edges 108, while others of the elements 106 on opposing ones of rolls 82 are preferably configured as annular serrations 110 about the rolls, the opposing husking elements being adapted to cooperatively operate for grasping husks 90 and rapidly pulling them from cobs 92, and downwardly into and through gaps 88, along with any loose residue and corn kernels, as the rolls are rotated. In operation, air flow A through and over upper sieve 70 will flow in a rearward direction through the region of chamber 40 below rolls 82, and will operate to carry most of the husks 90 airborne rearwardly within internal chamber 40, either so as to be inducted into and spread by optional spreader 74, or discharged directly onto the ground with the other light MOG (also referred to as chaff). Any kernels, because of their greater weight, will fall onto sieve 70, and pass therethrough to lower sieve 76.

The rotation of rolls 82 and husking elements 106 preferably also cooperate so as to act to convey cobs 92 rapidly along surface 80, as illustrated by arrows 112, or additional conveyance apparatus (not shown), such as wheels, belts or the like which can be incorporated into surface 80 or disposed thereabove for this purpose. As noted above, it should be understood that unlike conventional husking bed applications wherein husks are removed from ears of corn prior to removal of the corn kernels from the cobs, and wherein the ears are conveyed in orderly end to end relation along the husking rolls, here, the corn kernels have already been removed from the cobs and the cobs with remaining attached husks can comprise whole cobs, and/or cob fragments of various sizes, and, individually, will be substantially lighter in weight compared to whole ears of corn. Additionally, as a result of prior processing by machine 20, husks 90 which remain attached to cobs 92 will be oriented in a variety of ways relative to the cobs, including extending sidewardly, backwards, etc., and the husks will likely be tough and/or resilient, stringy, and otherwise hard to detach. Flow of cobs denoted by arrows 112 can also contain a wide variety of other loose residue and will not likely comprise an orderly end-to-end procession of ears. As a result, husking rolls 82 and associated husking elements 106 are desirably configured to grasp and detach husks 90 from cobs 92, while in a state of agitation, e.g., tumbling and rolling along surface 80 in a variety of orientations, essentially as illustrated in various of the FIGS.

As another feature of apparatus 78, husking rolls 82 terminate along respective shafts 104 in spaced relation to drive 94, such that larger gaps 114 (FIG. 6) exist between the adjacent rolls 82 adjacent to and in front of drive 94. This is advantageous, as cobs 92 conveyed by, or otherwise moved along rolls 82 as denoted by arrows 112 will fall through gaps 114. Alternatively, apparatus 78 could be configured in a suitable manner (not shown) without gaps 114, to allow the de-husked cobs to fall over the rear end of rolls 82 or framework 84, if desired. Gaps 114 are preferably located above a rear end of upper sieve 70 of cleaning system 42, which is fitted with openings 116 sufficiently large for passage of whole cobs 92 and cob fragments therethrough. Thus, the flow of de-husked cobs 92 will pass downwardly through the rearwardly directed flow of husks carried by air flow A, and drop onto the rear end of upper sieve 70 directly into or in proximity of openings 116, so as to pass through those openings. Larger elements of MOG contained in flow 66A (which should mainly comprise cobs) carried rearwardly along sieve 70, if appropriately sized, will also pass through openings 116. Other larger elements of MOG (leaves, stalk fragments) which is directed onto sieve 70 will pass over openings 116 and fall off the end of the sieve. Similar elements of MOG carried to the rear of apparatus 78 and too large to pass through gaps 114 will fall over the rear of that apparatus.

System 26 of the invention can include a variety of apparatus for receiving or handling the de-husked cobs 92 that pass through openings 116, preferably integrated into a platform with cleaning system 42. Here, as an example a cob conveyor 118 is located below openings 116 of upper sieve 70. As one alternative, conveyor 118 can be a helical auger type conveyor, having opposite hand flights 120 on opposite sides of a center region 122 (FIG. 3), so as to be operable for conveying the de-husked cobs 92 to the center region 122. A pan or chute 124 can be provided extending downwardly from center region 122 (FIG. 1), also as part of a cleaning system platform, for flow of the de-husked cobs from machine 20 and onto a conveyor of cob collection device 28. Alternatively, conveyor 118 can be configured for conveying the de-husked cobs to one side, to an elevator and/or other conveyor (not shown) configured and operable for carrying the cobs to a desired location, such as, but not limited to, an on-board tank, towed cart, or other suitable collection device. As still another alternative, a conveyor, hopper or chute could be disposed beneath gaps 114 of apparatus 78 for directing or carrying the de-husked cobs away.

Briefly addressing cob collection device 28 depicted in FIG. 2, that device can include one or more conveyors 126 configured and operable for conveying a flow of the de-husked cobs rearwardly into a container 128, the rearmost conveyor being adjustable for this purpose, as denoted by arrow 130. Here, device 28, as noted above, is configured as a cart or wagon, and includes suitable apparatus for unloading the cobs when desired, in the well known manner.

Referring also to FIGS. 9, 10 and 11, machine threshing system 24 of system 26 of machine 20 is shown including a concave 36 having alternative rear grates 132 including apertures in the form of slots 50 which are larger and differently configured compared to apertures 48 of the earlier discussed threshing system, like parts being referred to by like numerals. Threshing system 24 will operated in essentially the above-discussed manner, with threshing elements 34 on rotor 32 forming the crop into a crop mat that is moved in a helical manner through a cylindrical gap between rotor 32 and concave 36. Again, as this occurs, the corn kernels will be threshed from the cobs and will largely fall through the forward portion of concave 36, through the underlying region of internal chamber 40, onto grain pan 64, as denoted by flow 38.

At the rear end of threshing system 24, grates 132 have a plurality of elongate slots 50 which may range in width from ½ inch to as large as 2¼ inches, and most preferably about 1.25 inches in width. Slots 50 are preferably substantially vertical or longitudinally disposed so as to be essentially vertical and are oriented in the direction in which rotor 32 is rotating. Slots 50 may also be oriented down by an angle of up to about 40° from vertical. Slots 50 run the essentially the entire height of the grates 132. There are actually 4 separate grates 132 illustrated in FIG. 10 which come together collectively as one arcuate form comprising the lower rear end of concave 36. There are two or more slots 50 for each grate 132, two of which slots 50 are separated by a latitudinally disposed in-line row of smaller holes or slots 134. Each grate 132 has a row of the in-line smaller slots 134 that are peripherally in line with the direction of rotation of rotor 32. The peripheral row of smaller slots 134 along the edges of each grate 132 allow smaller MOG and some corn kernels that have made it through from the front of the threshing system to pass through the grates 132.

The additional alternative embodiment calling for at least one of slots 50 of the grates 132 to be oriented at an angle of up to 40° from vertical and in the direction of material flow, i.e. the direction in which the rotor's movement or rotation transports the material may be advantageous in some applications. A particular row of in-line smaller openings or slots 136 may optionally be oriented in a direction substantially parallel to direction of the slots 50 closest to the in-line row.

In operation, if less than the preferred width of slots 50 of about 1.25 inches is employed, slots 50 will be generally too small for passage of whole cobs therethrough. However, it has been observed that attached husks will have a tendency to enter slots 50 and be sheared from the cobs by the rotation of rotor 32 relative to peripheral edges 138 bounding slots 50, which is advantageous for de-husking purposes. With slots 50 configured thusly, most of the cobs will be discharged from threshing system 24 as part of flow 56 from outlet end 44 and many will be de-husked by the slotted grates 132. Alternatively, if slots 50 are of at least the preferred width of about 1.25 inches, whole cobs will be able to pass therethrough in flow 46. As an advantage of this larger slot configuration, some de-husking is likely to be effected by such passage, largely as a result of shearing action by contact between the husks and peripheral edges 138 of grates 132 bounding and defining slots 50. Others of the cobs not passing through the grates may also be de-husked as a function of the shearing action just discussed. As another advantage, flow 46 containing cobs 62, husks and cob fragments discharged through slots 50 will be deposited more forwardly on apparatus 78, so as to be exposed to greater contact with and de-husking action of husking rolls 82 thereof, in the above described manner. The already detached husks will also have more exposure to husking rolls 82, so as to be more pulled through apparatus 78 and separated from the cobs, which is another advantage. Once on apparatus 78, the cobs, husks and other MOG will be processed in the above described manner.

Referring also to FIG. 12, one embodiment of a flow guide 58 is show in position below and rearwardly of outlet end 44 of threshing system 24, below beater 58. Flow guide 58 here comprises a plurality of laterally spaced apart, downwardly extending fingers 138, preferably arcuate in shape when viewed from the side. Flow guide 58 in this configuration is adapted for guiding MOG flow 56 downwardly onto apparatus 78, while allowing MOG already on apparatus 78 to flow past. Fingers 138 will preferably be offset from the gaps between the rolls, such that MOG passing between fingers 138 will be in proximity to the gaps.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An agricultural combine, comprising:
a housing having an internal chamber containing a threshing system including a concave and a rotary beater, the threshing system configured and operable for threshing kernels of corn from cobs, discharging a flow of the kernels downwardly within the chamber, and discharging a flow of the cobs along a path within the chamber, wherein at least some of the discharged cobs include husks attached thereto;
de-husking apparatus comprising a generally horizontally disposed array of husking rolls, each husking roll extending substantially parallel to a longitudinal axis of the combine, each husking roll disposed at least partially below the concave and the rotary beater and extending a substantial distance therefrom, such that the husking rolls are disposed in a position in the path for receiving at least a substantial portion of the flow of cobs including the husks attached thereto, each of the husking rolls bounding a husking roll gap smaller than the cobs connecting with a region below the array, the husking rolls being supported for rotation about an axis therethrough and connected to drive apparatus configured for drivingly rotating the husking rolls about the axes, respectively, the husking rolls including husking elements thereon configured such that when the husking rolls are rotated by the drive apparatus, the elements will grasp and detach the husks from the cobs and drive the detached husks through the husking roll gaps into the region below the array, the husking rolls configured such that the rotation thereof will move the cobs along the de-husking apparatus toward one end thereof, and wherein the husking rolls each have a shaft positioned therethrough which supports each roll for rotation about the axis, the shaft connected to at least a portion of the drive apparatus, and wherein each husking roll terminates at an end thereof along its respective shaft and a distance from the portion of the drive apparatus such that large gaps are formed between ends of the rolls, shafts, and the drive apparatus so that the cobs conveyed along the husking rolls fall through the large gaps; and a cleaning system including at least one sieve disposed within the chamber below the threshing system and the de-husking apparatus in a position for receiving at least a portion of the flow of the kernels and separating the kernels from crop residue mixed therewith larger than the kernels.

2. The combine of claim 1, wherein a portion of the at least one sieve is disposed in the region below the array in position for receiving the detached husks.

3. The combine of claim 1, wherein a portion of the cleaning system is disposed below the one end of the de-husking apparatus and configured for carrying the cobs to a collection apparatus.

4. The combine of claim 3, wherein the portion of the cleaning system is configured to include a sieve section having openings therethrough sufficiently small to prevent passage of the cobs therethrough but sufficiently large for passage of elements of corn residue smaller than the cobs therethrough, and the sieve section being configured and operable to move in a manner for carrying the cobs thereon to the collection apparatus.

5. The combine of claim 4, wherein the collection apparatus comprises a conveyor.

6. The combine of claim 1, wherein the threshing system includes at least one grate disposed above the de-husking apparatus and having openings therethrough sufficiently large for passage of the cobs therethrough.

7. The combine of claim 1, wherein the threshing system is configured and operable for discharging the flow of the cobs mixed with other corn residue directly onto the de-husking apparatus.

8. The combine of claim 7, wherein the threshing system includes a powered device configured and operable for positively directing the flow of the cobs and the other corn residue onto the de-husking apparatus.

9. An agricultural combine for harvesting corn kernels from cobs, de-husking the cobs, and separating the de-husked cobs and the corn, comprising:

a housing having an internal chamber configured for receiving a flow of ears of corn; and a system disposed within the internal chamber, including:
threshing apparatus configured and operable receiving the flow of ears of corn and threshing the kernels of the corn from the cobs of the ears, discharging a flow of the kernels downwardly within the chamber separately of the cobs, and discharging a flow of the cobs along a path within the chamber, wherein at least some of the discharged cobs have husks attached thereto;

cleaning apparatus disposed below the threshing apparatus in position for receiving the flow of the kernels and including at least one generally horizontal platform configured and operable for cleaning crop residue from the kernels; and de-husking apparatus disposed for receiving at least the flow of the cobs having the husks attached thereto, comprising a side-by side array of husking rolls, each of the husking rolls bounding a husking gap smaller than the cobs connecting with a region below the array, the husking rolls being supported for rotation about an axis therethrough and connected to drive apparatus configured for drivingly rotating the husking rolls about the axes, respectively, the husking rolls including husking elements thereon configured such that when the husking rolls are rotated by the drive apparatus, the elements will grasp and detach the husks from the cobs and drive the detached husks through the husking gaps into the region below the array, the husking rolls configured such that the rotation thereof will move the cobs along the de-husking apparatus toward one end thereof, and wherein the husking rolls each have a shaft positioned therethrough which supports each roll for rotation about the axis, the shaft connected to at least a portion of the drive apparatus, and wherein each husking roll terminates at an end thereof along its respective shaft and a distance from the drive apparatus such that large gaps are formed between ends of the rolls, drive shafts, and the drive apparatus so that the cobs conveyed along the husking rolls fall through the large gaps.

10. The combine of claim 9, wherein a portion of the platform of the cleaning apparatus is disposed in the region below the array in position for receiving the detached husks.

11. The combine of claim 9, wherein each husking roll extends substantially parallel to a longitudinal axis of the combine.

12. The combine of claim 9, wherein each husking roll is disposed at least partially below a concave and a rotary beater and extends a substantial distance therefrom.

13. The combine of claim 9, wherein a portion of the platform of the cleaning apparatus is disposed below the one end of the de-husking apparatus and configured for carrying the cobs to a collection apparatus.

14. The combine of claim 13, wherein the portion of the platform is configured to include a sieve section having openings therethrough sufficiently small to prevent passage of the cobs therethrough but sufficiently large for passage of elements of corn residue smaller than the cobs therethrough, and the sieve section being configured and operable to move in a manner for carrying the cobs thereon to the collection apparatus.

15. The combine of claim 14, wherein the collection apparatus comprises a conveyor.

16. The combine of claim 9, wherein the threshing apparatus includes at least one grate disposed above the de-husking apparatus and having openings therethrough sufficiently large for passage of the cobs therethrough.

17. The combine of claim 9, wherein the threshing apparatus is configured and operable for discharging the flow of the cobs mixed with other corn residue directly onto the de-husking apparatus.

18. The combine of claim 17, wherein the threshing apparatus includes a powered device configured and operable for positively directing the flow of the cobs and the other corn residue onto the de-husking apparatus.

19. An agricultural combine for harvesting corn kernels from cobs, de-husking the cobs, and separating the de-husked cobs and the corn, comprising:
a housing having an internal chamber configured for receiving a flow of ears of corn; and
a system disposed within the internal chamber, including:
threshing apparatus configured and operable receiving the flow of ears of corn and threshing the kernels of the corn from the cobs of the ears, discharging a flow of the kernels downwardly within the chamber separately of the cobs, and discharging a flow of the cobs onto a downwardly extending ramp within the chamber, wherein at least some of the discharged cobs have husks attached thereto;
cleaning apparatus including a platform structure having a portion disposed beneath the threshing apparatus for receiving the flow of the kernels and configured and operable for cleaning crop residue from the kernels; and
de-husking apparatus disposed adjacent to a discharge end of the ramp of the threshing apparatus for receiving the flow of the cobs, comprising a side-by side array of husking rolls, each of the husking rolls bounding a husking gap smaller than the cobs connecting with a region below the array, the husking rolls being supported for rotation about an axis therethrough and connected to drive apparatus configured for drivingly rotating the husking rolls about the axes, respectively, the husking rolls including husking elements thereon configured such that when the husking rolls are rotated by the drive apparatus, the elements will grasp and detach the husks from the cobs and drive the detached husks through the husking gaps into the region below the array, the husking rolls configured such that the rotation thereof will move the cobs along the de-husking apparatus toward one end thereof, and wherein the husking rolls each have a shaft positioned therethrough which supports each roll for rotation about the axis, the shaft connected to at least a portion of the drive apparatus, and wherein each husking roll terminates at an end thereof along its respective shaft and a distance from the portion of the drive apparatus such that large gaps are formed between ends of the rolls, shafts, and the drive apparatus so that the cobs conveyed along the husking rolls fall through the large gaps.

20. The combine of claim 19, wherein the downwardly extending ramp comprises a grate.

21. The combine of claim 19, wherein at least a portion of the de-husking apparatus is disposed beneath the threshing apparatus for receiving a portion of the kernels therefrom, and is configured for transferring the kernels to the cleaning apparatus.

* * * * *